United States Patent Office 3,459,742
Patented Aug. 5, 1969

3,459,742
SULFANILAMIDE DERIVATIVES AND PROCESSES
Hanns Hanina Lehr, Montclair, N.J., assignor to Hoffmann-La Roche Inc., Nutley, N.J., a corporation of New Jersey
No Drawing. Continuation-in-part of application Ser. No. 353,290, Mar. 19, 1965. This application June 1, 1965, Ser. No. 460,489
Int. Cl. C07d 51/44
U.S. Cl. 260—239.75                            1 Claim

ABSTRACT OF THE DISCLOSURE $N^1$-methyl, allyl or 2-propynyl substituted $N^1$-(6-methoxy-4-pyrimidinyl)-sulfanilamide derivatives, prepared, inter alia, by reacting $N^1$ - (6 - methoxy-4-pyrimidinyl)-sulfanilamide and a methyl halide, allyl halide or propynyl halide, are described. The end products are useful as antibacterial agents.

---

This application is a continuation-in-part of copending application Ser. No. 353,290, filed Mar. 19, 1965, now abandoned.

This invention relates to substituted sulfanilamide derivatives and more particularly relates to $N^1$-substituted-$N^1$ - (6-methoxy-4-pyrimidinyl)sulfanilamide derivatives and to processes for their preparation.

It is widely recognized in the art that substitution of the $N^1$-hydrogen atom of an active sulfonamide by, e.g., an alkyl group, substantially decreases or abolishes the antibacterial activity of the resulting compound.

It has now surprisingly been found that compounds of the formula

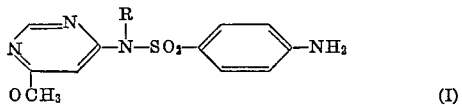

(I)

wherein R is methyl, allyl, or 2-propynyl, and their acid addition salts with strong pharmaceutically acceptable acids, e.g., minerals acids such as HCl, $H_2SO_4$, etc., exhibit high antibacterial activity, as well as a wide spectrum of antibacterial activity. This is a very unusual and unexpected finding since these compounds and their salts appear to be unique in this respect. Other related $N^1$-substituted pyrimidine sulfonamide derivatives have not been found to exhibit the high antibacterial activity and/or the wide spectrum of activity exhibited by these compounds. The preferred compounds of this invention is the $N^1$-methyl compound and its acid addition salts.

Methods for the preparation of the instant compounds of formula I are as follows:

Method A.—An alkali metal salt, preferably the sodium salt, of $N^1$-(R-substituted)sulfanilamide is reacted with 4,6-dihalopyrimidine, preferably in about equimolar amount, to form $N^1$-(6-halo-4-pyrimidinyl)$N^1$-(R-substituted)sulfanilamide, and the latter compound reacted with an alkali metal methoxide, preferably sodium methoxide, in methanol to give an $N^1$-(6-methoxy-4-pyrimidinyl)-$N^1$-(R-substituted)sulfanilamide of Formula I. The 4,6-dihalopyrimidine employed in the above reaction is either the 4,6-dichloro, 4,6-dibromo, or 4,6-diiodo derivative, preferably the 4,6-dichloro derivative. The reaction of the alkali metal salt of $N^1$-(R-substituted)sulfanilamide with 4,6-dihalopyrimidine is carried out in an organic solvent, which is substantially inert to the reactants, e.g., ketones, ethers, amides, aromatic hydrocarbons, etc. Specific examples include dimethylformamide, acetamide, acetone, dioxane, benzene, etc., preferably dimethylformamide. Solvents containing an appreciable quantity of water or an alcohol should not be employed due to the certainty or likelihood of reaction with the alkali metal salt of $N^1$-(R-substituted)sulfanilamide.

Method B.—The alkali metal salt, preferably the sodium salt, of $N^1$-(6-methoxy-4-pyrimidinyl)sulfanilamide is reacted with a methyl halide, allyl halide, or 2-propynl halide, i.e., a chloride, bromide, or iodide, to form $N^1$ - (6 - methoxy - 4 - pyrimidinyl) - $N^1$-(R-substituted)sulfanilamide. The same solvents as in Method A are employed.

In the above process descriptions R has the same meaning as in Formula I.

The compounds of Formula I and acid addition salts are useful as antibacterial agents in the same manner as known active sulfonamides currently used in therapy.

The invention will be better understood from a consideration of the following examples which are given for illustration purposes only and are not meant to limit the invention.

Example 1

$N^1$-methylsulfanilamide (69 g.) is added to a stirred and ice-cooled solution of 14.5 g. of sodium hydroxide in 100 ml. of water. After 15 minutes, the filtered solution is evaporated to dryness in vacuo. The sodium salt, thus obtained, is dried in vacuo at 130° to constant weight.

60 g. of 4,6-dichloropyrimidine is dissolved in 400 ml. of dimethylformamide. To this solution is added 70.5 g. of the sodium salt of $N^1$-methylsulmanilamide, the mixture heated for 4 hours at 70–80°, and then stirred for 18 hours at room temperature. The reaction mixture is poured slowly into 3 liters of water and stirred for 2 hours. The crystalline product is filtered off and dried in vacuo. After recrystallization from benzene-hexane, the product, $N^1$ - (6 - chloro - 4 - pyrimindinyl) - $N^1$-methylsulfanilamide, melts at 118–120°.

87.5 g. of $N^1$ - (6 - chloro-4-pyrimidinyl)-$N^1$-methylsulfanilamide is dissolved in 650 ml. of methanol. A solution of 7 g. of sodium in 300 ml. of methanol is added and the mixture stirred at room temperature for 18 hours. The crystals are filtered off, washed with a minimum of cold methanol, and dried in vacuo at 50°. On concentration of the filtrate, a second crop of crystals is obtained. Total yield: 79 g. The combined product, $N^1$-(6-methoxy-4-pyrimidinyl)-$N^1$-methylsulfanilamide, is recrystallized from 90 percent aqueous methanol with the aid of Norite. Melting point: 152–153°.

Example 2

5.9 g. of $N^1$-(6-methoxy-4-pyrimidinyl)sulfanilamide, sodium salt [prepared from $N^1$ - (6 - methoxy-4- pyrimidinyl)sulfanilamide by treatment thereof with NaOH] is suspended in 250 ml. of acetone. 25 ml. of methyl iodide is added and the mixture refluxed for 2 hours. The solvent is removed in vacuo, and the residue treated with aqueous methanol. The crystals are filtered off and recrystallized from aqueous methanol. Melting point: 152–153°. The mixing melting point with $N^1$-(6-methoxy-4-pyrimidinyl)-$N^1$-methylsulfanilamide prepared in Example 1 gives no depression.

Example 3

To a solution of 74 g. of $N^1$-allylsulfanilamide in 800 ml. of ethanol was added 8.1 g. of sodium in 500 ml. of ethanol. The mixture was concentrated to one half its volume and excess ether was added. The sodium salt was filtered off, and dried in vacuo.

To a solution of 30.8 g. of 4,6-dichloropyrimidine in 200 ml. of dimethylformamide was added 48 g. of $N^1$-allylsulfanilamide, sodium salt. The resulting mixture was heated at 85° for 2 hours, and then stirred at room temperature for 18 hours. The reaction mixture was poured into 2 liters of water, and the semisolid product that precipitated was dissolved in chloroform and dried over sodium sulfate. After removal of the solvent in vacuo, 32 g. of a viscous oil was obtained which was dissolved in 75 ml. of methanol. To this solution was added a solution of 2.3 g. of sodium in 25 ml. of methanol, and the mixture was stirred for 18 hours at room temperature. After filtration, the solvent was removed in vacuo, and the residue recrystallized from dilute methanol with the aid of activated charcoal. $N^1$-allyl-$N^1$-(6-methoxy-4-pyrimidinyl)sulfanilamide was obtained which melted at 128–130°.

Example 4

$N^1$-(2-propynl)sulfanilamide (37.5 g.) was added to a solution of 4.1 g. of sodium in 250 ml. of ethanol. The mixture was concentrated to one half its volume and excess ether was added. The sodium salt was filtered off and dried in vacuo.

To a solution of 20 g. of 4,6-dichloropyrimidine in 200 ml. of dimethylformamide was added 31 g. of $N^1$-(2-propynyl)sulfanilamide, sodium salt. The resulting mixture was heated at 80° for 2 hours and then stirred at room temperature for 18 hours. The reaction mixture was filtered, evaporated to dryness, the residue dissolved in methylene chloride, washed thoroughly with water, and dried over sodium sulfate. After removal of the solvent in vacuo, 39.4 g. of a viscous oil was obtained which was dissolved in 250 ml. of methanol. To this solution was added a solution of 3 g. of sodium in 100 ml. of methanol, and the mixture was stirred at room temperature for 18 hours. The precipitated product, $N^1$-(6-methoxy-4-pyrimidinyl)-$N^1$-(2-propynyl)sulfanilamide, was filtered off and recrystallized from acetone water with the aid of activated charcoal. Melting point: 171–172°.

I claim:
1. $N^1$-(6-methoxy-4-pyrimidinyl)-$N^1$-(2-propynyl)-sulfanilamide.

References Cited

UNITED STATES PATENTS 2,407,966  9/1946  Sprague _____ 260—239.75

FOREIGN PATENTS 914,455  1/1963  Great Britain.
230,380  12/1963  Austria.

OTHER REFERENCES

Shepherd et al., J. Org. Chem. vol. 26, pp. 2764 to 2769 (1961).

JOHN D. RANDOLPH, Primary Examiner

U.S. Cl. X.R.

260—999